United States Patent
Schenk

(10) Patent No.: US 8,009,576 B2
(45) Date of Patent: Aug. 30, 2011

(54) TRANSMISSION LINKS

(75) Inventor: Heinrich Schenk, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 769 days.

(21) Appl. No.: 11/713,288

(22) Filed: Mar. 2, 2007

(65) Prior Publication Data
US 2008/0212485 A1 Sep. 4, 2008

(51) Int. Cl.
*H04J 3/16* (2006.01)
(52) U.S. Cl. ........................ 370/252; 455/437
(58) Field of Classification Search ................ 370/252, 370/431, 437, 201; 455/127.1
See application file for complete search history.

(56) References Cited

U.S. PATENT DOCUMENTS

| | | | |
|---|---|---|---|
| 7,046,751 B1 | 5/2006 | Kantschuk et al. | |
| 7,076,168 B1 | 7/2006 | Shattil | |
| 7,177,284 B2 * | 2/2007 | Peleg et al. | 370/252 |
| 2001/0019538 A1 * | 9/2001 | Mizutani et al. | 370/248 |
| 2002/0188668 A1 | 12/2002 | Jeffery et al. | 709/203 |
| 2003/0058803 A1 * | 3/2003 | Casper | 370/252 |
| 2003/0099350 A1 | 5/2003 | Bostoen et al. | |
| 2003/0137925 A1 * | 7/2003 | Zamir | 370/201 |
| 2003/0165114 A1 * | 9/2003 | Kusama et al. | 370/216 |
| 2004/0047283 A1 * | 3/2004 | Bonwick et al. | 370/201 |
| 2005/0078666 A1 * | 4/2005 | Beshai | 370/380 |
| 2007/0121706 A1 * | 5/2007 | Nakamura et al. | 375/141 |
| 2007/0121715 A1 | 5/2007 | Shi | |
| 2007/0263711 A1 | 11/2007 | Kramer et al. | |
| 2007/0268811 A1 | 11/2007 | Clausen | |
| 2008/0068978 A1 * | 3/2008 | Clausen | 370/201 |
| 2008/0182531 A1 * | 7/2008 | Lagnado et al. | 455/127.1 |
| 2008/0310520 A1 | 12/2008 | Schenk | |

OTHER PUBLICATIONS

"Transmission and Multiplexing (TM); Access transmission systems on metallic access cables; Very high speed Digital Subscriber Line (VDSL); Part 1: Functional requirements", ETSI TS 101 270-1 V1.3.1 (Jul. 2003), European Telecommunications Standard Institute 2003, 82 pgs.
"Second Letter Ballot Draft of the DSM Technical Report", NIPP-NAI, Nashville, TN. Feb. 12-15, 2007, 97 pgs.
Bagheri, H., et al., "Iterative Joint Power Control and Partial Crosstalk Cancellation in Upstream VDSL", Transactions on Engineering, Computing and Technology V2, ISSN 1305-5313, Dec. 2004, p. 31-34.
Cendrillon, R., et al., "Partial Crosstalk Cancellation for Upstream VDSL", EURASIP Journal of Applied Signal Processing, 2004, p. 1520-1535.
Office Action dated Sep. 17, 2009 issued to U.S. Appl. No. 11/762,653.
Office Action dated Feb. 25, 2010 issued to U.S. Appl. No. 11/762,653.
Office Action dated Oct. 15, 2010 issued to U.S. Appl. No. 11/762,653.

* cited by examiner

*Primary Examiner* — Brian D Nguyen
(74) *Attorney, Agent, or Firm* — Eschweiler & Associates, LLC

(57) ABSTRACT

An apparatus and method is disclosed with a circuit selecting a first number of transmission channels from a plurality of transmission channels for a first number of transmission links, wherein the selection depends on channel capacities of the first number of transmission channels. A second number of transmission channels is selected from the plurality of transmission channels for a second number of transmission links, wherein the selection depends on channel capacities of the second number of transmission channels.

26 Claims, 10 Drawing Sheets

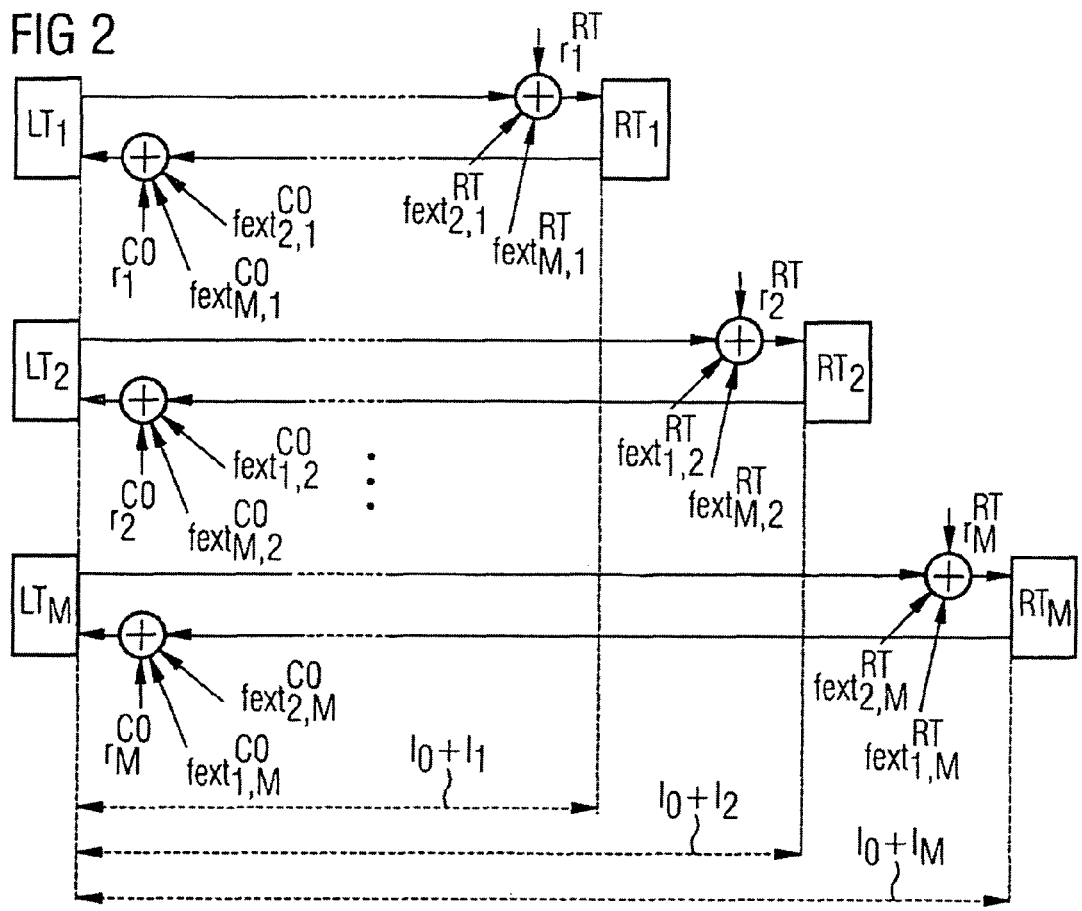
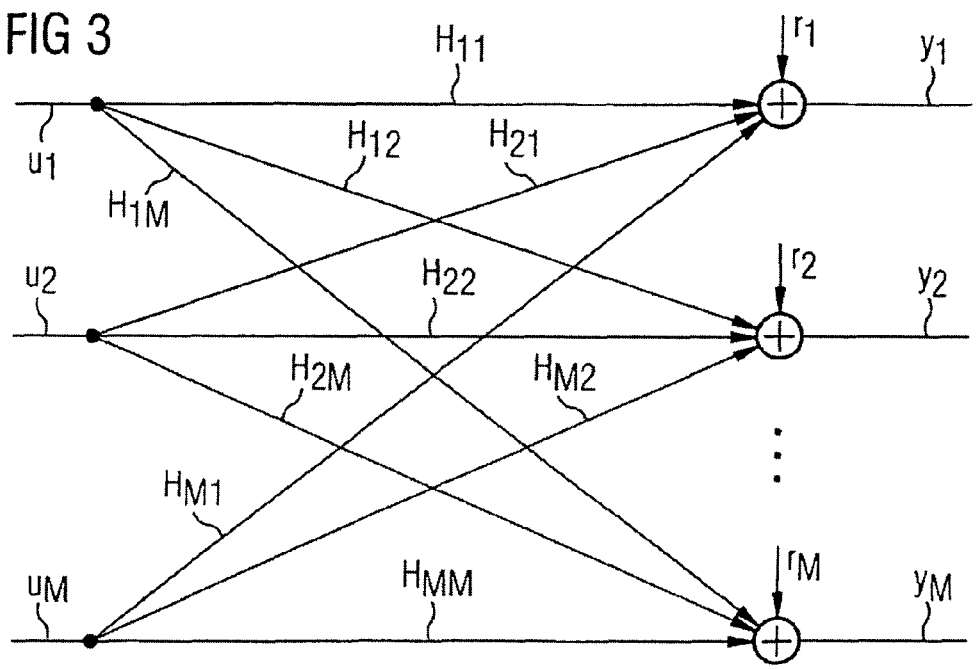

FIG 4
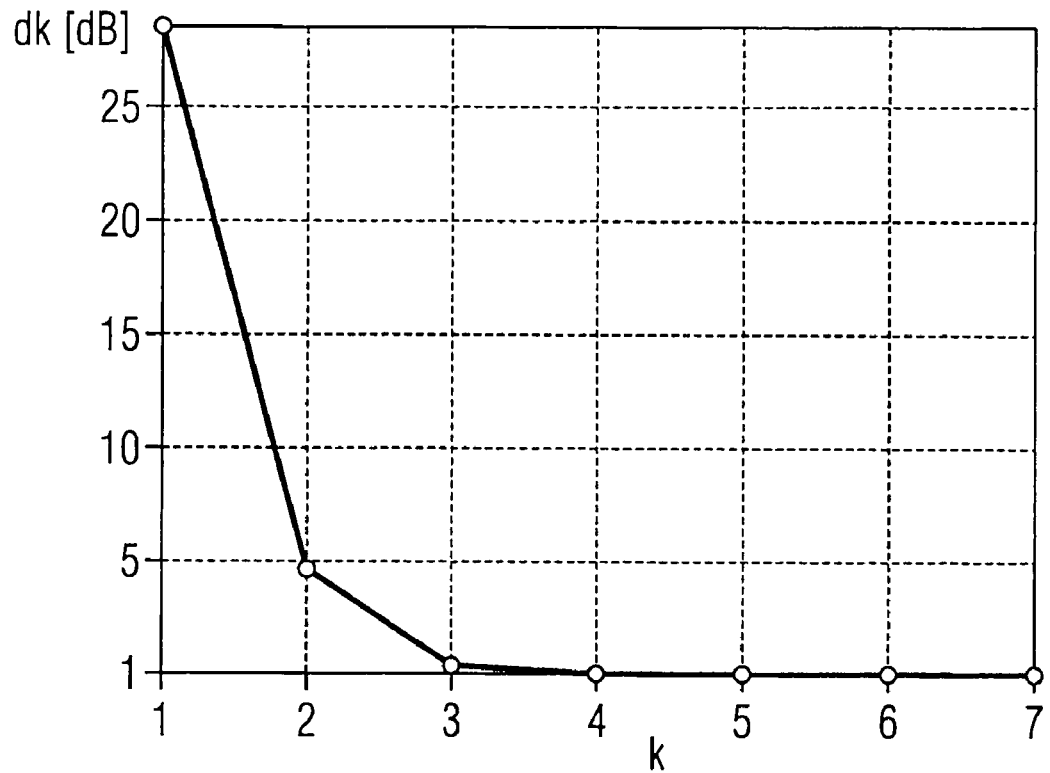
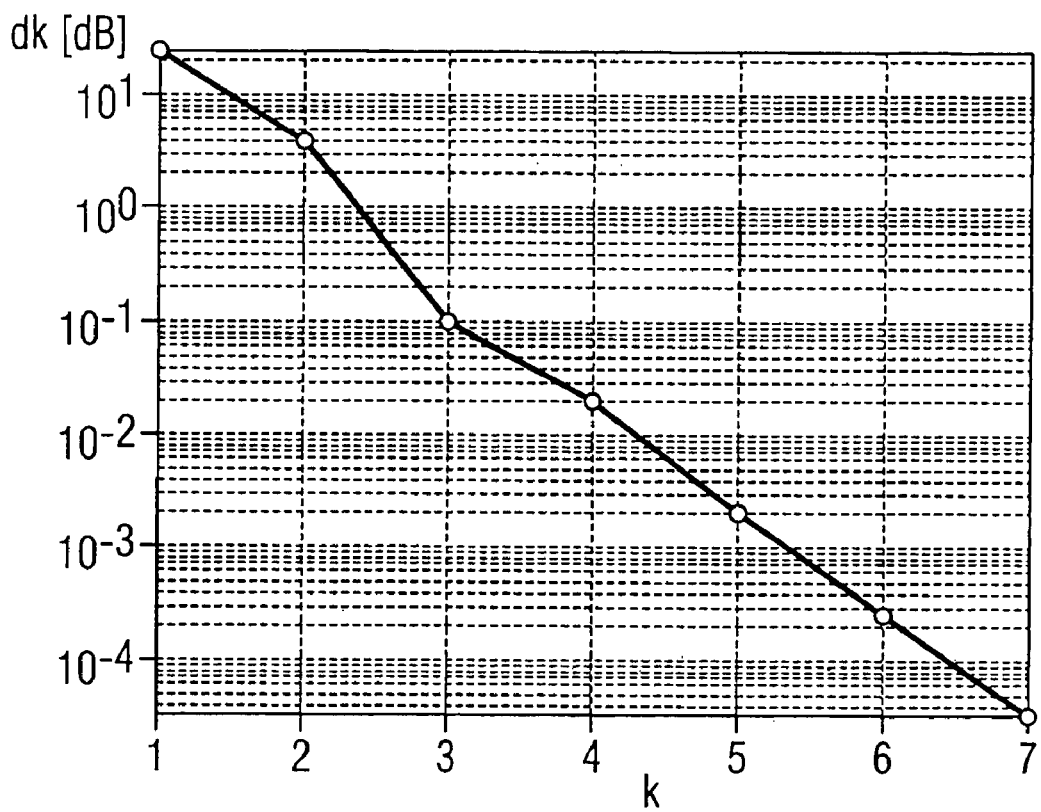

FIG 5
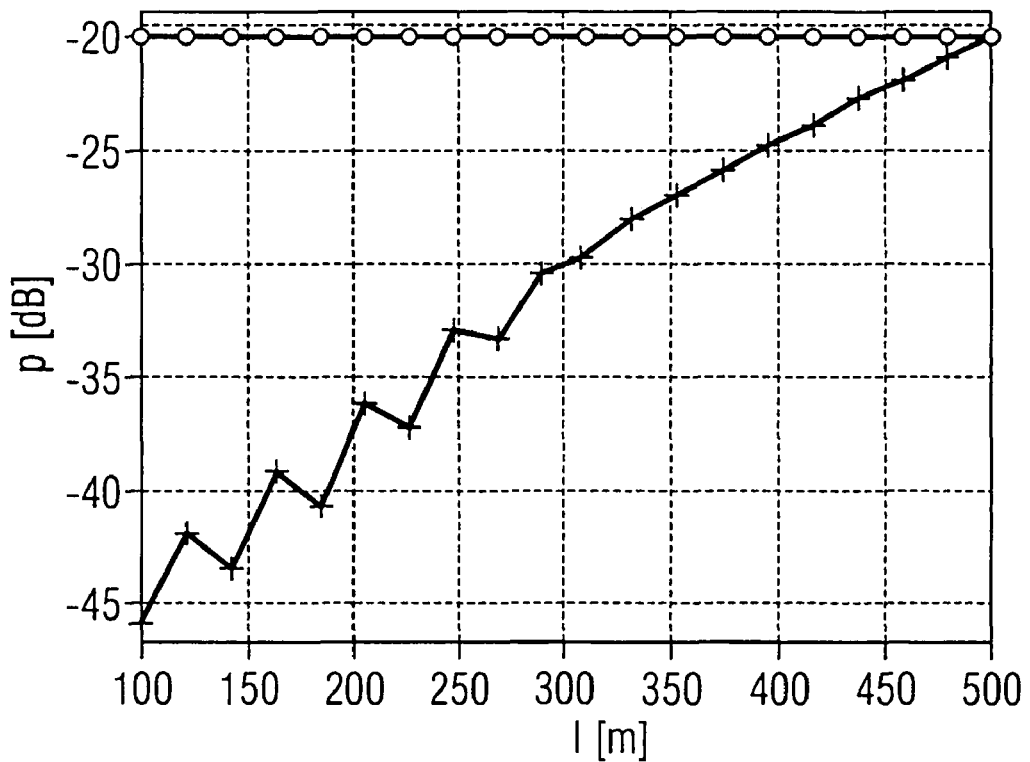
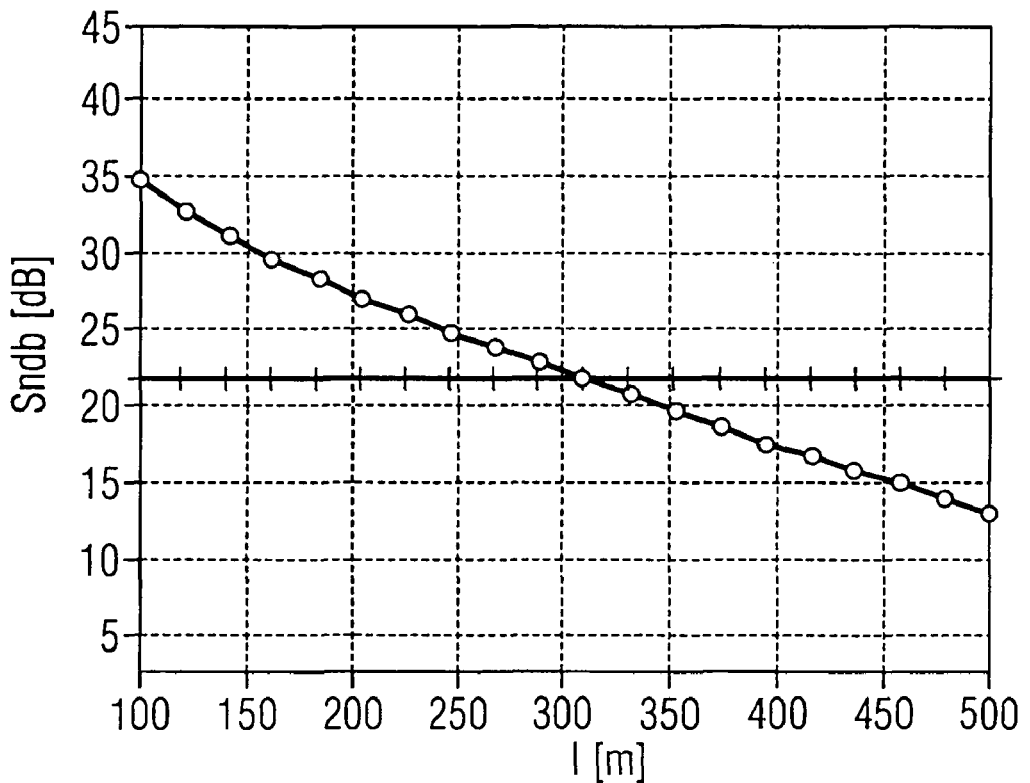

FIG 7
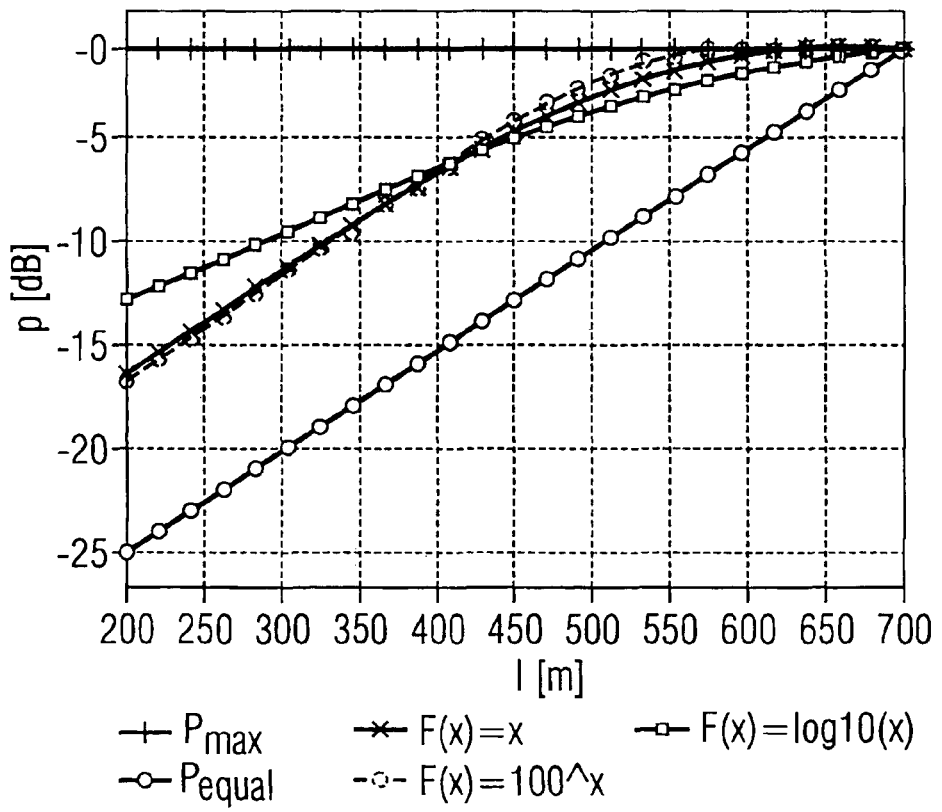
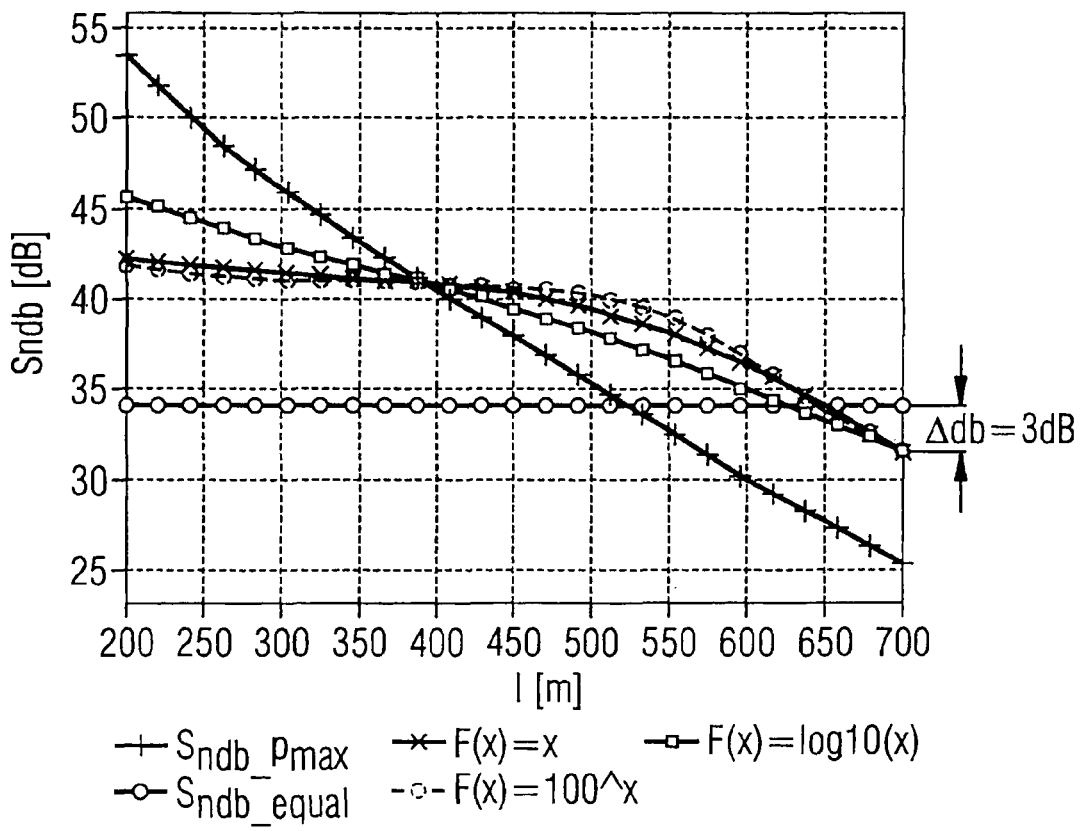

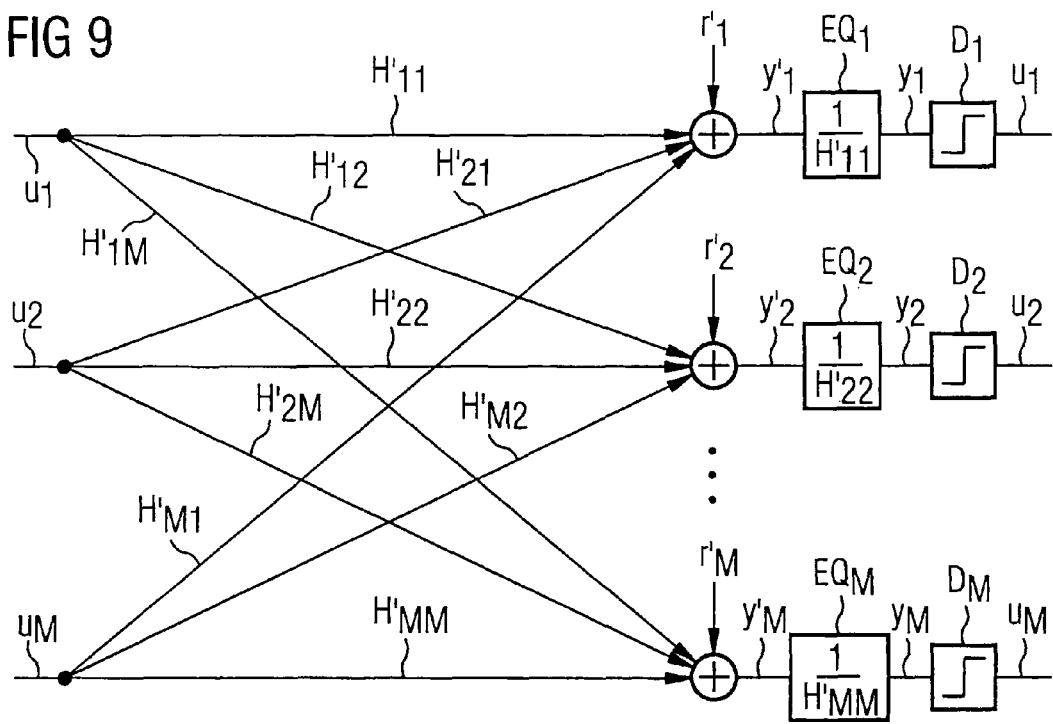
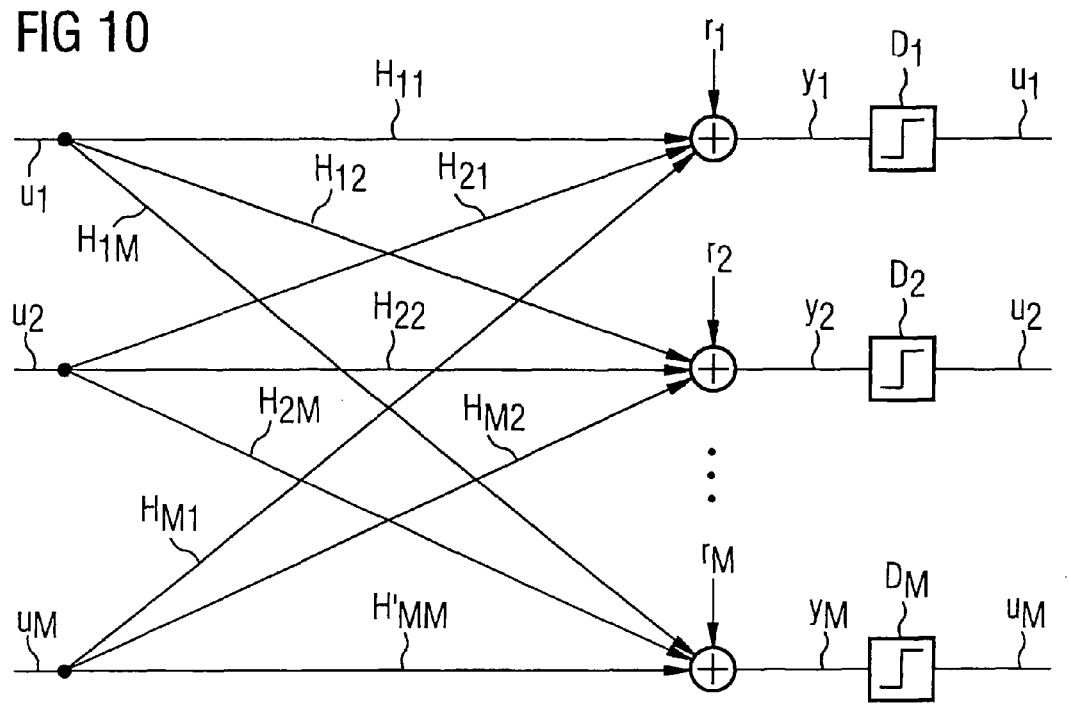

TRANSMISSION LINKS

BACKGROUND OF THE INVENTION

Telecommunication and broadband services are usually provided to customer premises via twisted pairs of wires. The twisted pairs are often grouped in close proximity into binder groups. Data transmission in these settings may suffer from interference arising from electromagnetic coupling between neighboring twisted pairs, referred to as crosstalk interference.

BRIEF DESCRIPTION OF THE SEVERAL VIEWS OF THE DRAWINGS

FIG. 2 illustrates a model of a transmission system.

FIG. 3 illustrates an interference channel model showing crosstalk interference among the transmission lines $L_1$ to $L_M$.

FIG. 4 illustrates the convergence of an embodiment of an iterative method I.

FIG. 5 illustrates exemplary results of a simulation of an embodiment of the method I.

FIG. 7 illustrates exemplary results of a simulation of an embodiment of an iterative method II.

FIG. 9 illustrates a further interference channel model showing crosstalk interference among the transmission lines $L_1$ to $L_M$.

FIG. 10 illustrates yet a further interference channel model showing crosstalk interference among the transmission lines $L_1$ to $L_M$.

DETAILED DESCRIPTION OF THE INVENTION

Figure 1:
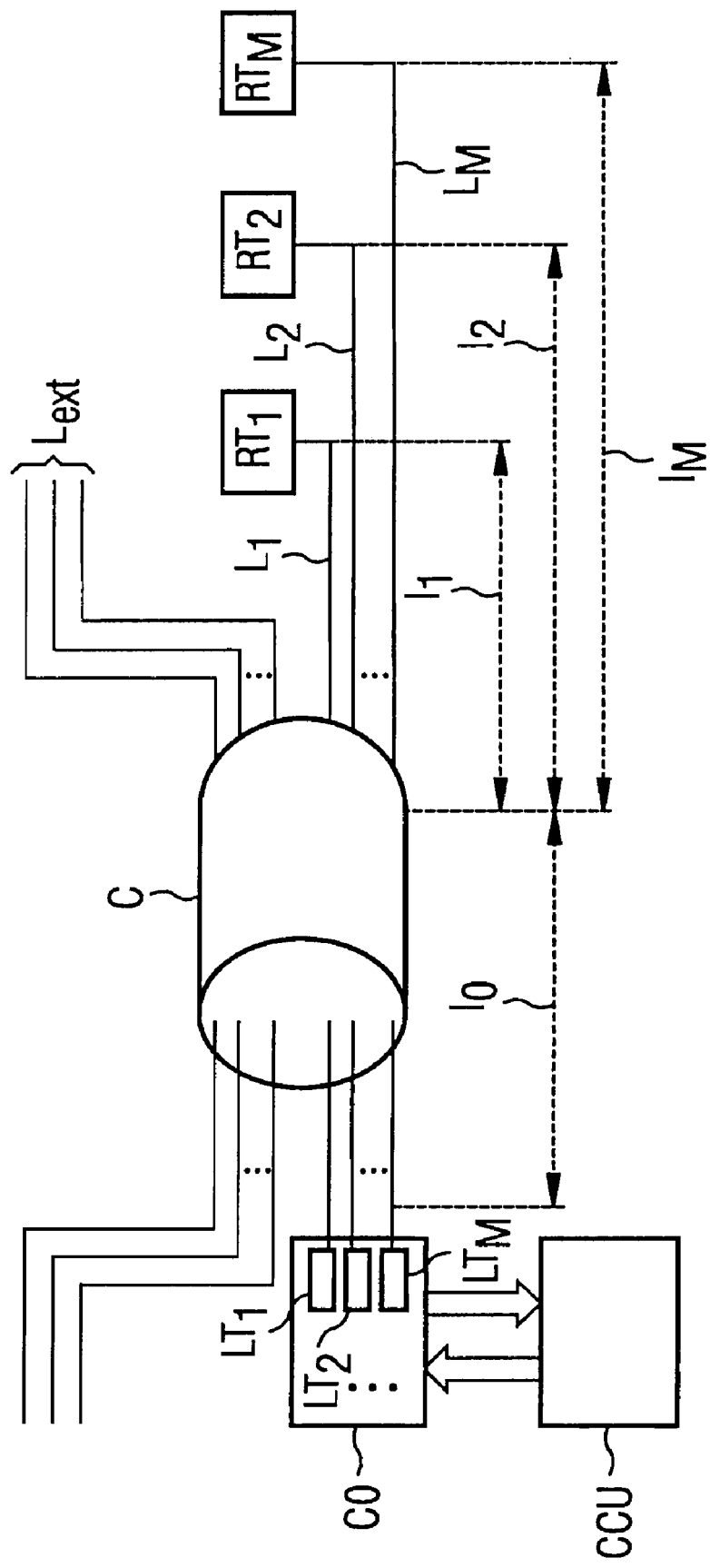
FIG. 1 schematically illustrates a network of a plurality of transmission lines $L_1$ to $L_M$.

The following embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, a schematic diagram of a network of a plurality of transmission lines $L_1$ to $L_M$ is shown. The transmission lines $L_1$ to $L_M$ are bundled together within a cable C over a length $l_0$. The network has a central office CO comprising a plurality of transceivers $LT_1$ to $LT_M$ coupled to the respective ends of the transmission lines $L_1$ to $L_M$. At the subscriber premises transceivers $RT_1$ to $RT_M$ are coupled to the other respective ends of the transmission lines $L_1$ to $L_M$. The transceivers $RT_1$ to $RT_M$ may, for example, be modems. Data transmission from the central office CO to a subscriber is called downstream data transmission, whereas data transmission from a subscriber to the central office CO is called upstream data transmission.

While transmission lines $L_1$ to $L_M$ may have all the same length, it is to be noted that they may also have different lengths. In the network shown in FIG. 1 the length of a transmission line $L_i$ is the sum of the length $l_0$ and a length $l_i$ (i=1, . . . , M). The length $l_0$ is the length over which the transmission lines $L_1$ to $L_M$ are bundled together and occupy the same cable C. The length $l_i$ is the length from the end of the cable C to the transceiver $RT_i$. Each of the transmission lines $L_1$ to $L_M$ may, for example, be a pair of twisted wires.

Furthermore, it is to be noted that the cable C may comprise transmission lines $L_{ext}$, which are not coupled to the central office CO.

The transmission lines $L_1$ to $L_M$ may form a telecommunication channel. Since voice telephony uses only a small fraction of the bandwidth usually available on the transmission lines $L_1$ to $L_M$, the remaining fraction of the available bandwidth may be used for transmitting data. For data transmission there are a number of services available, such as ISDN (Integrated Services Digital Network) or ADSL (Asymmetric Digital Subscriber Line) or VDSL (Very high bit-rate Digital Subscriber Line) or VDSL2 (Very high bit-rate Digital Subscriber Line 2).

In systems such as the system shown in FIG. 1, due to the proximity of the transmission lines $L_1$ to $L_M$ within the cable C of the length $l_0$, crosstalk interference between different neighboring transmission lines $L_1$ to $L_M$ exists. Depending on the location where the crosstalk is introduced, two types of interference are distinguished which are explained in the following: near-end crosstalk (NEXT) and far-end crosstalk (FEXT).

NEXT refers to interference between neighboring transmission lines $L_1$ to $L_M$ that arises when signals are transmitted in opposite directions. If the neighboring transmission lines $L_1$ to $L_M$ carry the same type of service, then the interference is called self-NEXT.

FEXT refers to interference between neighboring transmission lines $L_1$ to $L_M$ that arises when signals are transmitted in the same direction. If the neighboring transmission lines $L_1$ to $L_M$ carry the same type of service, such as VDSL, then the interference is called self-FEXT.

Furthermore, noise can be coupled to the transmission lines $L_1$ to $L_M$ that is generated by other sources than neighboring transmission lines $L_1$ to $L_M$. This noise is called alien noise and may, for example, be generated by the transmission lines $L_{ext}$.

If different frequency bands are used for downstream data transmission and upstream data transmission, which is for example the case in VSDL, NEXT does not affect the transmission quality. However, FEXT causes more serious problems.

According to one embodiment, the frequency band used for transmitting signals in downstream direction is different from the frequency band used for transmitting signals in upstream direction. As a consequence, self-NEXT can be excluded as a source of interference, however self-FEXT must be considered. For example, VDSL or ADSL may be used as services for transmitting data over the transmission lines and DMT (Discrete Multi-Tone) modulation may be used for modulating signals, however the embodiment described in the following is not limited thereto. The embodiment may be also applied to a system which uses the same frequency band, but different time slots for downstream and upstream directions.

The network of the transmission lines $L_1$ to $L_M$ of the present embodiment is shown in FIG. 1. The transceivers $LT_1$ to $LT_M$ of the central office CO as well as the transceivers $RT_1$ to $RT_M$ at the subscriber premises comprise units which allow measurement of the signal-to-noise ratios of signals received over the respective transmission lines $L_1$ to $L_M$. The values of the measured signal-to-noise ratios are transferred to a central control unit CCU, which is coupled to the central office CO. The central control unit CCU sets the power levels of the signals transmitted by the transceivers $LT_1$ to $LT_M$ and $RT_1$ to $RT_M$. Special transmission and control channels are provided between the central office CO and the transceivers $RT_1$ to $RT_M$ in order to exchange data between the central control unit CCU and the transceivers $RT_1$ to $RT_M$.

FIG. 2 illustrates a model of the transmission system in one embodiment. The model only considers the transmission lines $L_1$ to $L_M$ which are coupled to the central office CO. The arrows between the transceivers $LT_i$ and $RT_i$ illustrate the logical connections between the transceivers $LT_i$ and $RT_i$ ($i=1, \ldots, M$). Since it is assumed that there is no crosstalk interference between downstream and upstream directions, the power levels in downstream and upstream directions can be determined separately.

As can be seen from FIG. 2, self-FEXT signals fext and interfering signals r disturb the signals transmitted between the transceivers $LT_i$ and $RT_i$. The interfering signals r are caused by alien noise which may be due to the transmission lines $L_{ext}$, which are not coupled to the central office CO, and other external sources.

In FIG. 3 an interference channel model is illustrated exhibiting crosstalk interference among the transmission lines $L_1$ to $L_M$ in either downstream or upstream direction. A signal $u_i$ is provided to the input terminal of a transmission line $L_i$ and a signal $y_i$ is received at the output terminal of the transmission line $L_i$ ($i=1, \ldots, M$). A transfer function $H_{ji}$ is the transfer function of a channel from the input terminal of a transmission line $L_i$ to the output terminal of the transmission line $L_j$ for a specific frequency channel ($j=1, \ldots, M$). The transfer functions $H_{ii}$ are the transfer functions of the transmission lines $L_1$ to $L_M$ and the transfer functions $H_{ji, i \ne j}$ are the crosstalk transfer functions.

According to the interference channel model shown in FIG. 3, the signal $y_i$ received at the output terminal of the transmission line $L_i$ is as follows:

$$y_i = u_i \cdot H_{ii} + \sum_{j=1, j \ne i}^{M} u_j \cdot H_{ji} + r_i \quad (1)$$

Assuming that the signals transmitted over different transmission lines are not correlated, the signal-to-noise ratio $Sn_i$ at the output terminal of the transmission line $L_i$, which is the ratio between the power S of the wanted signal and the power N of the noise, is given by the following equation:

$$Sn_i = \left(\frac{S}{N}\right)_i = \frac{\langle u^2 \rangle_i \cdot |H_{ii}|^2}{\sum_{j=1, j \ne i}^{M} \langle u^2 \rangle_j \cdot |H_{ji}|^2 + \langle r^2 \rangle_i} \quad (2)$$

Since many signals have a very wide dynamic range, signal-to-noise ratios are usually expressed in terms of the logarithmic decibel scale. In decibels, the logarithmic signal-to-noise ratio $Sndb_i$ is 10 times the logarithm of the power ratio $Sn_i$:

$$Sndb_i = 10 \cdot \log_{10}\left(\left(\frac{S}{N}\right)_i\right) \quad (3)$$

In order to be able to transmit high bit rates, the values of the signal-to-noise ratio $Sn_i$ should be large. The channel capacity $R_i$ of the transmission line $L_i$, which is the number of bits that can be transmitted per frequency channel and data symbol, is:

$$R_i = \log_2\left(1 + \frac{Sn_i}{Sn_{ref}}\right) \text{ bit} \quad (4)$$

$Sn_{ref}$ is a reference signal-to-noise ratio, which depends on the wanted bit error rate, the margins and the coding gain.

As can be seen from equation (2), the signal-to-noise ratio $Sn_i$ measured at the output terminal of the transmission line $L_i$ depends on the power levels of the signals $u_1$ to $u_M$, the transfer function $H_{ii}$, the transfer functions $H_{ji, j \ne 1}$ and the power level of the alien noise interference signal $r_i$. Two extreme cases may arise:

(a) FEXT can be neglected compared to alien noise. In this case the signal-to-noise ratio $Sn_i$ only depends on the transmit power level of the signal $u_i$. In order to achieve a high signal-to-noise ratio $Sn_i$, it is favorable to feed the transmission lines $L_1$ to $L_M$ with signals $u_1$ to $u_M$ at the highest power level.

(b) Alien noise can be neglected compared to FEXT. In this case the signal-to-noise ratio $Sn_i$ depends on the transmit power levels of all signals $u_1$ to $u_M$. If the signals $u_1$ to $u_M$ have equal transmit power levels, shorter transmission lines $L_i$ produce better signal-to-noise ratios $Sn_i$.

Description of a Method I:

In the following a method I is discussed as an exemplary embodiment, which allows a determination of the transmit power levels $p_1$ to $p_M$ for signals provided to the input terminals of the transmission lines $L_1$ to $L_M$ so that the signals received at the output terminals of the transmission lines $L_1$ to $L_M$ exhibit equal signal-to-noise ratios $Sn_1$ to $Sn_M$. As a result the same maximized data rate can be transmitted over the transmission lines $L_1$ to $L_M$. The method I is performed either for the downstream or the upstream direction and for a single frequency channel.

The transmit power levels $p_1$ to $p_M$ of the signals provided to the transmission lines $L_1$ to $L_M$, the signal-to-noise ratios $Sn_1$ to $Sn_M$ measured at the output terminals of the transmission lines $L_1$ to $L_M$, and the logarithmic signal-to-noise ratios $Sndb_1$ to $Sndb_M$ are combined in vectors p, Sn and Sndb, respectively:

$$p = \begin{bmatrix} p_1 \\ p_2 \\ \vdots \\ p_M \end{bmatrix} \quad (5)$$

$$Sn = \begin{bmatrix} Sn_1 \\ Sn_2 \\ \vdots \\ Sn_M \end{bmatrix} \quad (6)$$

$$Sndb = \begin{bmatrix} Sndb_1 \\ Sndb_2 \\ \vdots \\ Sndb_M \end{bmatrix} \quad (7)$$

According to one embodiment, at the first cycle of the method I, which is denoted with k=1, signals are concurrently provided to the transmission lines $L_1$ to $L_M$ having the highest transmit power level $p_{max}$:

$$p(k=1) = \begin{bmatrix} p_{max} \\ p_{max} \\ \vdots \\ p_{max} \end{bmatrix} \quad (8)$$

The signal-to-noise ratios $Sn(1)_1$ to $Sn(1)_M$ of the signals, which are received at the output terminals of the transmission lines $L_1$ to $L_M$, are measured. According to a further embodiment, the signal-to-noise ratios $Sn(1)_1$ to $Sn(1)_M$ measured in the first cycle of the method (k=1) are used for determining the transmit power levels p(k=2) of the second cycle:

$$p(k=2) = \begin{bmatrix} \left(\frac{p(1)_1}{Sn(1)_1}\right) \\ \left(\frac{p(1)_2}{Sn(1)_2}\right) \\ \vdots \\ \left(\frac{p(1)_M}{Sn(1)_M}\right) \end{bmatrix} \quad (9)$$

According to one embodiment, the vector p(2) is scaled:

$$\hat{p}(2) = p(2) \cdot \frac{p_{max}}{\max(p(2))} \quad (10)$$

In equation (10) max(p(2)) denotes the maximum component of the vector p(2) of equation (9). The scaling prevents exceeding the maximum power level $p_{max}$.

The scaled vector $\hat{p}(2)$ provides the transmit power levels for the signals provided to the input terminals of the transmission lines $L_1$ to $L_M$ during the second cycle of the method I. At the output terminals of the transmission lines $L_1$ to $L_M$ the signal-to-noise ratios $Sn(2)_1$ to $Sn(2)_M$ or the logarithmic signal-to-noise ratios $Sndb(2)_1$ to $Sndb(2)_M$ are measured. Transmitting signals over the transmission lines $L_1$ to $L_M$ and measuring their signal-to-noise ratios $Sn(k)_1$ to $Sn(k)_M$ or their logarithmic signal-to-noise ratios $Sndb(k)_1$ to $Sndb(k)_M$ is then iteratively repeated.

The iterations are repeated until the measured signal-to-noise ratios $Sn(k)_1$ to $Sn(k)_M$ or the measured logarithmic signal-to-noise ratios $Sndb(k)_1$ to $Sndb(k)_M$ reach sufficient convergence (k=$k_{max}$). At each of the iteration cycles k=2 to k=$k_{max}$−1 the signal-to-noise ratios $Sn(k)_1$ to $Sn(k)_M$ or the logarithmic signal-to-noise ratios $Sndb(k)_1$ to $Sndb(k)_M$ of the signals received at the output terminals of the transmission lines $L_1$ to $L_M$ are measured and used for setting the transmit power levels p(k+1) of the signals provided to the input terminals of the transmission lines $L_1$ to $L_M$ during the next iteration cycle k+1:

$$p(k+1)_i = \frac{1}{Sn(k)_i} \cdot p(k)_i \quad (11)$$

Before the determined transmit power levels are used for providing signals to the transmission lines $L_1$ to $L_M$, the vector p(k+1) may be scaled:

$$\hat{p}(k+1) = p(k+1) \cdot \frac{p_{max}}{\max(p(k+1))} \quad (12)$$

In equation (12) max(p(k+1)) denotes the maximum component of the vector p(k+1). The scaled vector $\hat{p}(k+1)$ is used for providing signals to the transmission lines $L_1$ to $L_M$ at the iteration cycle k+1.

The following example shows the behavior of the method I. The simulated network comprises 20 transmission lines $L_1$ to $L_{20}$. The lengths of the transmission lines $L_1$ to $L_{20}$ are evenly distributed between 100 m and 500 m. Both FEXT disturbances and alien disturbances are considered.

FIG. 4 illustrates the convergence of the applied iterative method. In FIG. 4 a difference d(k) is plotted versus the iteration index k. The difference d(k) is the difference between the maximum logarithmic signal-to-noise ratio and the minimum logarithmic signal-to-noise ratio measured at each iteration cycle k:

$$d(k) = \max(Sndb(k)) - \min(Sndb(k)) \quad (13)$$

The upper diagram of FIG. 4 shows the difference d(k) on a linear scale, whereas the lower diagram of FIG. 4 shows the difference d(k) on a logarithmic scale. It can be seen from FIG. 4 that the difference d(k) between the maximum logarithmic signal-to-noise ratio and the minimum logarithmic signal-to-noise ratio becomes smaller than 0.1 dB after 3 iteration cycles, which means that the logarithmic signal-to-noise ratios measured at the output terminals of the transmission lines $L_1$ to $L_{20}$ have sufficiently converged at this point in time.

FIG. 5 shows a plot of the transmit power level p versus the length l of the transmission lines and a plot of the resulting logarithmic signal-to-noise ratios Sndb versus the length l in the presence of FEXT and alien noise. Data illustrated by circles were recorded when the maximum power level $p_{max}$ was used for providing signals to the transmission lines $L_1$ to $L_{50}$. Data illustrated by asterisks were recorded after the iterative method described above had reached convergence (k=$k_{max}$). It is evident from FIG. 5 that performing the iterative method I results in a convergence of the signal-to-noise ratios of all transmission lines.

Since the method I improves the signal-to-noise ratios of longer transmission lines especially if FEXT is the dominant source of interference, it is interesting to know a measure of the presence of FEXT compared to alien noise. Such a measure is given by a variable η:

$$\eta = \frac{a}{b} \qquad (14)$$

In equation (14) variables a and b are introduced. The variables a and b are defined as follows:

$$a = \max(Sndb(1)) - \min(Sndb(k_{max})) \qquad (15)$$

$$b = \max(Sndb(1)) - \min(Sndb(1)) \qquad (16)$$

Figure 6:
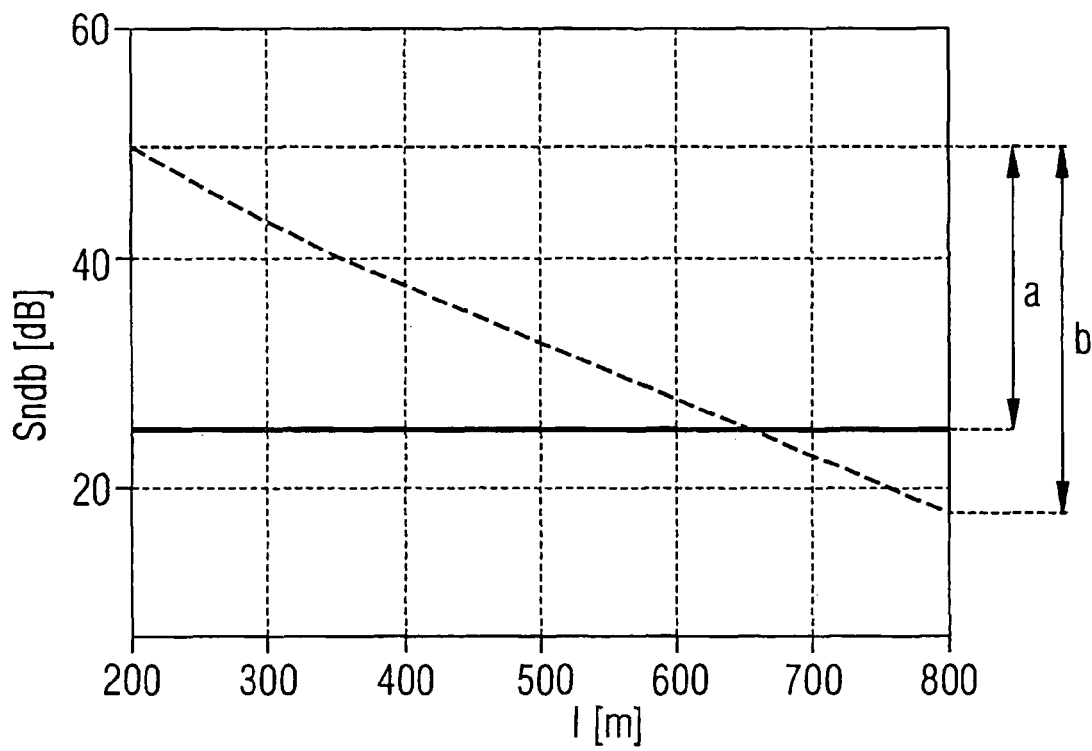
FIG. 6 illustrates definitions of variables a and b.

In equations (15) and (16) the terms max(Sndb(1)) and min(Sndb(1)) denote the maximum and minimum components of the vector Sndb at k=1, respectively, when signals are provided to the transmission lines at the maximum power level. The term min(Sndb($k_{max}$)) denotes the maximum component of the vector Sndb when the iterative method I has reached sufficient convergence meaning min(Sndb($k_{max}$))≈max(Sndb($k_{max}$)). The definitions of the variables a and b are also illustrated in FIG. 6.

If FEXT does not occur, the variable η is one. The higher the presence of FEXT, the more the variable η decreases.

Description of a Method II:

In the following an iterative method II, according to one embodiment is described which improves the signal-to-noise ratios of the shorter transmission lines compared to the iterative method I described above. The improvement is achieved by successively increasing the transmit power levels of the signals provided to the transmission lines $L_1$ to $L_{M-1}$ until the logarithmic signal-to-noise ratio obtained from at least one transmission line, which is usually the longest transmission line $L_M$, falls below a predetermined threshold value $Sndb_{min}$. The transmit power level of the signals provided to the longest transmission line $L_M$ is kept constant.

Before starting the iterative method II transmit power levels $\tilde{p}(0)_i$ (i=1, ..., M) must be known, which, when used for providing signals to the transmission lines $L_1$ to $L_M$, produce equal logarithmic signal-to-noise ratios at the output terminals of the transmission lines $L_1$ to $L_M$. For example, the transmit power levels $\tilde{p}(0)_i$ are given by the transmit power levels $p(k_{max})_i$, which are obtained in the final iteration cycle $k_{max}$ of the iterative method I, which produced an equal logarithmic signal-to-noise ratio $Sndb(k_{max})_i$ for all transmission lines $L_1$ to $L_M$.

Starting from the transmit power levels $\tilde{p}(0)_i$, the transmit power levels are successively increased at each iteration cycle until the logarithmic signal-to-noise ratio measured at the output terminal of at least one transmission line $L_i$ is reduced by more than a predetermined parameter Δdb compared to the logarithmic signal-to-noise ratio $Sndb(k_{max})_i$.

According to one embodiment, before starting the iterative method II it is verified whether Δdb<b−a. If this inequality is false, the maximum power level $p_{max}$ may be chosen for all of the transmission lines $L_1$ to $L_M$ and the iterative method II is not performed any further. If the inequality is true, the iterative method II is started.

The iteration cycles of the method II are denoted with $\tilde{k}$ (=1, 2, ... ). At the beginning of each iteration cycle signals are provided to the input terminals of the transmission lines $L_1$ to $L_M$. The signals are received at the output terminals of the transmission lines $L_1$ to $L_M$ and the logarithmic signal-to-noise ratios $Sndb(\tilde{k})_i$ are measured for each signal. The transmit power levels $\tilde{p}(\tilde{k})$ for each iteration cycle $\tilde{k}$ are given by the following equations:

$$\tilde{p}(\tilde{k}) = \begin{bmatrix} \tilde{p}(\tilde{k})_1 \\ \tilde{p}(\tilde{k})_2 \\ \vdots \\ \tilde{p}(\tilde{k})_M \end{bmatrix} \qquad (17)$$

$$\tilde{p}(\tilde{k}+1) = \tilde{p}(\tilde{k}) \cdot |1 - \tilde{g} \cdot \tilde{d}(\tilde{k})| \qquad (18)$$

$$\tilde{p}(0) = p(k_{max}) \qquad (19)$$

In equation (19) $\tilde{g}$ is a predetermined constant, which influences the convergence of the method, and $\tilde{d}(\tilde{k})$ is a vector of functions $\tilde{F}$ of the transmit power levels $\tilde{p}(\tilde{k})_i$, which will be discussed in more detail later:

$$\tilde{d}(\tilde{k})_i = \tilde{F}\left(\frac{\tilde{p}(\tilde{k})_i}{p_{max}}\right) \qquad (20)$$

Before the transmit power levels $\tilde{p}(\tilde{k}+1)_i$ are used for providing signals to the transmission lines $L_1$ to $L_M$, the vector $\tilde{p}(\tilde{k}+1)$ may be scaled:

$$\hat{p}(\tilde{k}+1) = \tilde{p}(\tilde{k}+1) \cdot \frac{p_{max}}{\max(\tilde{p}(\tilde{k}+1))} \qquad (21)$$

In equation (21) max($\tilde{p}(\tilde{k}+1)$) denotes the maximum component of the vector $\tilde{p}(\tilde{k}+1)$. The scaled vector $$\hat{p}(\tilde{k}+1)$$

is used for transmitting signals during the iteration cycle $\tilde{k}+1$ over the transmission lines $L_1$ to $L_M$. Scaling causes the transmit power level $\hat{p}(\tilde{k}+1)_M$ of the longest transmission line $L_M$ to be constant.

According to a further embodiment, the vector $\tilde{p}(\tilde{k}+1)$ of equation (18) is shifted once more:

$$\tilde{p}(\tilde{k}+1) = |\tilde{p}(\tilde{k}+1) - \tilde{\tilde{g}} \cdot \tilde{d}(\tilde{k}) \cdot p_{max}| \qquad (22)$$

In equation (22)

$$\tilde{\tilde{g}}$$

is a predetermined constant. The vector $$\tilde{p}(\tilde{k}+1)$$

may be scaled:

$$\hat{\tilde{p}}(\tilde{k}+1) = \tilde{p}(\tilde{k}+1) \cdot \frac{p_{max}}{\max(\tilde{p}(\tilde{k}+1))} \qquad (23)$$

The termination condition of the iterative method II is:

$$\min(Sndb(\tilde{k}_{max})) < \min(Sndb(k_{max})) - \Delta db \qquad (24)$$

According to equation (24) the iterative method II is terminated or at least interrupted if at least one of the measured logarithmic signal-to-noise ratios at a iteration cycle $\tilde{k}_{max}$ falls below the difference $\min(Sndb(k_{max})) - \Delta db$. In this case the iterative method II is either terminated or it is started again with smaller constants $\tilde{g}$ and $\tilde{\tilde{g}}$. For restarting the iterative method II transmit power levels $\tilde{p}(\tilde{k} < \tilde{k}_{max})$ are used.

In the following a simulation is presented which illustrates an embodiment of the iterative method II. The simulated network is a VDSL network and comprises 25 transmission lines $L_1$ to $L_{25}$ in a cable C. The lengths of the transmission lines $L_1$ to $L_{25}$ are evenly distributed between 200 m and 700 m. The network is based on a model as shown in FIG. 3. The type of interference is self-FEXT and alien noise. The parameter $\Delta db$ is set to 3 dB. For the function $\tilde{F}$ (cf. equation (20)) a linear function, an exponential function and a logarithmic function are chosen:

$$\tilde{F}\left(\frac{\tilde{p}(\tilde{k})_i}{p_{max}}\right) = \frac{\tilde{p}(\tilde{k})_i}{p_{max}} \qquad (25)$$

$$\tilde{F}\left(\frac{\tilde{p}(\tilde{k})_i}{p_{max}}\right) = 100^{\frac{\tilde{p}(\tilde{k})_i}{p_{max}}} \qquad (26)$$

$$\tilde{F}\left(\frac{\tilde{p}(\tilde{k})_i}{p_{max}}\right) = \log_{10}\left(\frac{\tilde{p}(\tilde{k})_i}{p_{max}}\right) \qquad (27)$$

FIG. 7 shows a plot of the transmit power level p versus the length l of the transmission lines $L_1$ to $L_{25}$ and a plot of the resulting logarithmic signal-to-noise ratio Sndb versus the length l in the presence of FEXT and alien noise. The three functions $\tilde{F}$ according to equations (25) to (27) were used for the simulation. It is evident from FIG. 7 that performing the iterative method II results in better logarithmic signal-to-noise ratios for shorter transmission lines, whereas the signal-to-noise ratios of the longer transmission lines are only slightly decreased.

So far, methods I and II for determining transmit power levels for a single frequency channel were discussed. In order to adjust the total power spectrum density of all modems, the described iterative methods I and II may be performed for all frequency channels. For that, signals of different frequency channels can be transmitted over the transmission lines concurrently.

Description of a Method III:

In the following, a method III serving as a further embodiment is presented, an aim of which is to increase the bit rates of the longer transmission lines at the cost of reducing the bit rates of the shorter transmission lines. In this embodiment, the maximum transmit power $P_{max}$ of each of the transmission lines $L_1$ to $L_M$ is pre-determined. The maximum transmit power $P_{max}$ is evenly distributed over the frequency channels used for transmitting signals over the transmission line $L_i$ ($i=1, \ldots, N$). If the number of the frequency channels used for transmitting signals over the transmission line $L_i$ is $N_i$, then the maximum power spectral density or the maximum transmit power level $p_{max,i}$ for each frequency channel is:

$$p_{max,i} = \frac{P_{max}}{N_i} \qquad (28)$$

Furthermore, the maximum transmit power level $p_{max,i}$ may also be selected among the value of equation (28) and a pre-determined value $PSD_{max}$ of the maximum power spectral density:

$$p_{max,i} = \min\left\{\frac{P_{max}}{N_i}, PSD_{max}\right\} \qquad (29)$$

The method III described in the following aims to determine the optimal number $N_{opt,1}$ to $N_{opt,N}$ of frequency channels (or transmission channels) used for the transmission over the transmission lines $L_1$ to $L_M$, respectively. In a first step of the method III, the number $N_{opt,M}$ of frequency channels used for the longest transmission line $L_M$ is determined. For this purpose, the method I, which has been described above, is carried out in order to determine the transmit power levels $p_1$ to $p_M$ for signals provided to the input terminals of the transmission lines $L_1$ to $L_M$ so that the signals received at the output terminals of the transmission lines $L_1$ to $L_M$ exhibit equal signal-to-noise ratios $Sn_1$ to $Sn_M$. The method I is carried out for several frequency channels n (n=1, ..., $N_{max}$) and for each frequency channel n a common signal-to-noise ratio $Sn_n$ is detected for the transmission lines $L_1$ to $L_M$. By using the following equation, the channel capacity R can be calculated, which is the sum of the channel capacities of the frequency channels n=1 to n=$N_{max}$, wherein the channel capacity of the frequency channel n is the number of bits (or the amount of discrete information) that can be transmitted per unit time (or per data symbol) over the frequency channel n:

$$R = \sum_{n=1}^{N_{max}} \left(\log_2\left(1 + \frac{Sn_n}{Sn_{ref}}\right)\right) \text{bit} \qquad (30)$$

$Sn_{ref}$ is a reference signal-to-noise ratio, which may be adjusted, for example, depending on the wanted bit error rate, the margins and the coding gain. For the calculation of equation (30) only those summands may be considered that exhibit at least one bit. The maximum number of bits of each of the summands may be pre-determined, for example 15 bit.

Equation (30) has a maximum depending on the number $N_{max}$ of frequency channels n. The number $N_{max}$, at which the channel capacity R of equation (30) reaches its maximum, is determined and is denoted as $N_{opt,M}$. The number $N_{opt,M}$ defines the number of frequency channels used for transmitting signals over the longest transmission line $L_M$. The maximum transmit power level $p_{opt,M}$ for each of the frequency channels of the longest transmission line $L_M$ is:

$$P_{opt,M} = \frac{P_{max}}{N_{opt,M}} \qquad (31)$$

Figure 8:
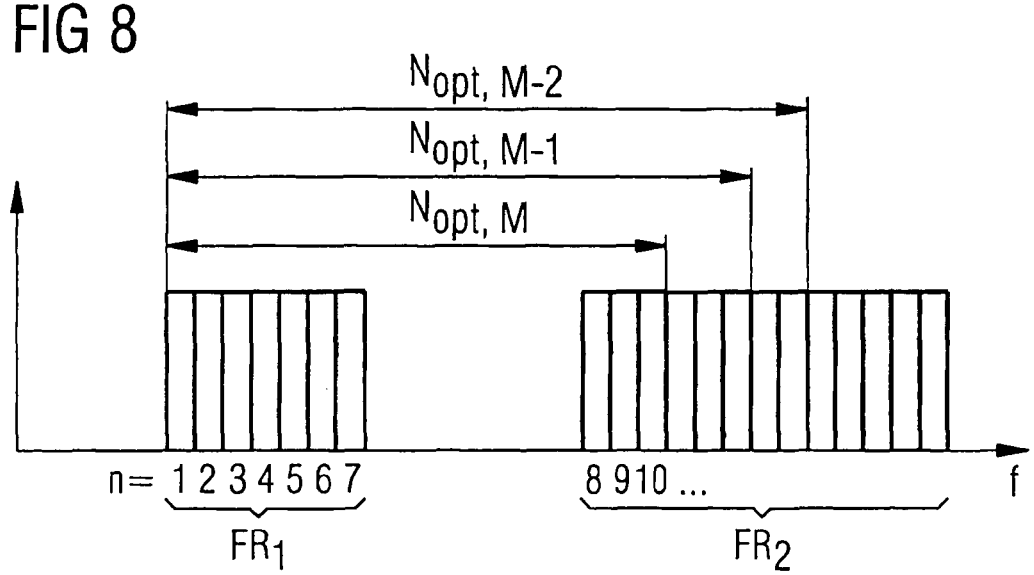
FIG. 8 illustrates frequency ranges and frequency channels.

In FIG. 8 two frequency ranges $FR_1$ and $FR_2$ are shown, in which data transmission over the transmission lines $L_1$ to $L_M$ is allowed according to the used transmission service, for example VDSL. The frequency ranges $FR_1$ and $FR_2$ are divided into frequency channels n and each frequency channel n is associated with a carrier frequency. Exemplarily the number $N_{opt,M}$ of frequency channels is shown where equation (30) has a peak when considering transmission lines $L_1$ to $L_M$.

After having determined the optimal number $N_{opt,M}$ of frequency channels for the longest transmission line $L_M$, the method II, which has been described above, may be carried out. For that, an appropriate parameter $\Delta db$ and a function $\tilde{F}$ are selected. As a result the $N_{opt,M}$ frequency channels used for the longest transmission line $L_M$ exhibit all together the maximum transmit power $P_{max}$, whereas the transmit powers of the other transmission lines $L_1$ to $L_{M-1}$ are smaller than the maximum transmit power $P_{max}$.

In a second step of method III, the number $N_{opt,M-1}$ of the frequency channels used for the second longest transmission line $L_{M-1}$ is determined. For this purpose, the method steps described above for the longest transmission line $L_M$ may be carried out analogously for the second longest transmission line $L_{M-1}$. For that, the longest transmission line $L_M$ is no longer considered. This means that method I is carried out in order to determine the transmit power levels $p_1$ to $p_{M-1}$ for signals provided to the input terminals of the transmission lines $L_1$ to $L_{M-1}$ so that the signals received at the output terminals of the transmission lines $L_1$ to $L_{M-1}$ exhibit equal signal-to-noise ratios $Sn_1$ to $Sn_{M-1}$. Further, the number $N_{max}$, at which the channel capacity R of equation (30) reaches its maximum, is determined by varying the number of frequency channels and is denoted as $N_{opt,M-1}$. The number $N_{opt,M-1}$ defines the number of frequency channels used for transmitting signals over the second longest transmission line $L_{M-1}$ as schematically illustrated in FIG. 8. The number $N_{opt,M-1}$ may be larger than the number $N_{opt,M}$. The maximum transmit power level $p_{opt,M-1}$ for each of the frequency channels of the second longest transmission line $L_{M-1}$ is:

$$p_{opt,M-1} = \frac{P_{max}}{N_{opt,M-1}} \quad (32)$$

After having determined the optimal number $N_{opt,M-1}$ of frequency channels for the second longest transmission line $L_{M-1}$, the method II may be carried out as described above. As a result the $N_{opt,M-1}$ frequency channels used for the second longest transmission line $L_{M-1}$ exhibit all together the maximum transmit power $P_{max}$, whereas the transmit powers of the remaining transmission lines $L_1$ to $L_{M-2}$ are smaller than the maximum transmit power $P_{max}$.

In a third and in subsequent steps of method III, the number $N_{opt,M-2}$ of the frequency channels used for the third longest transmission line $L_{M-2}$ and the number $N_{opt,M-3}$ to $N_{opt,1}$ of the frequency channels used for the other transmission lines $L_{M-3}$ to $L_1$ may be determined. For this purpose, the method steps described above may be carried out analogously for the transmission lines $L_{M-2}$ to $L_1$.

Each step of method III leads to a number $N_{opt,i}$ of frequency channels used for transmitting signals over the longest transmission line $L_i$, which is considered in the corresponding method step. The method III may be continued in the described manner until either all of the transmission lines exhibit the maximum transmit power $P_{max}$ or until all of the frequency channels n of the available frequency range $FR_1$ and $FR_2$ have been used. In the latter case, the remaining transmission lines do not exhibit the maximum transmit power $P_{max}$.

Instead of classifying the transmission lines $L_1$ to $L_M$ according to their lengths, the transmission lines $L_1$ to $L_M$ may be classified according to their logarithmic signal-to-noise ratios SndB. In this case the transmission line $L_M$ shows the lowest logarithmic signal-to-noise ratio, the transmission line $L_{M-1}$ shows the second lowest logarithmic signal-to-noise ratio etc.

Description of a Method IV:

In the following, a method IV is presented for determining crosstalk transfer functions $H_{ji,\ i\neq j}$ caused by FEXT and interfering signals r caused by alien noise. The transfer functions $H_{ii}$ may be determined by using a common method known to a person skilled in the art. The transfer functions $H_{ii}$ and $H_{ji,\ i\neq j}$ as well as the interfering signals r may be used to determine the signal-to-noise ratios $Sn_i$ and $Sndb_i$ according to equations (2) and (3). In case there is no interference between different frequency channels, such as in DMT transmission systems, the transfer functions $H_{ji,\ i\neq j}$ and the interfering signals r may be determined separately for each frequency channel. In the following the method IV is therefore described for only one frequency channel, but may be applied to other frequency channels as well.

The interference channel model shown in FIG. 3 may be extended by adding equalizers $EQ_1$ to $EQ_M$ and deciders $D_1$ to $D_M$ as illustrated in FIG. 9. The equalizers $EQ_1$ to $EQ_M$ multiply the received signals with the inverses $1/H'_{11}$ to $1/H'_{MM}$ of the transfer functions $H'_{11}$ to $H'_{MM}$, respectively. The interference channel model of FIG. 9 may be rearranged by integrating the equalizers $EQ_1$ to $EQ_M$ into the transfer functions $H'_{ii}$ and $H'_{ji,\ i\neq j}$, which results in an interference channel model as shown in FIG. 10. In this interference channel model all transfer functions $H_{ii}$ are 1. Further, the power of the interfering signals r caused by alien noise needs to be weighted:

$$\langle r_i^2 \rangle = \frac{1}{|H_{ii}|} \cdot \langle r_i'^2 \rangle \quad (33)$$

Moreover, equation (1) has to be adapted:

$$y_i = u_i + \sum_{j=1, j\neq i}^{M} u_j \cdot H_{ji} + r_i, \quad (34)$$

wherein the signals $u_1$ to $u_M$ are the output signals of the deciders $D_1$ to $D_M$, respectively.

For the determination of the FEXT transfer functions $H_{ji,\ i\neq j}$ a linear system of equations can be established. For i=1 the following equation is obtained:

$$\begin{bmatrix} y_1(1)-u_1(1) \\ y_1(2)-u_1(2) \\ \vdots \\ y_1(L)-u_1(L) \end{bmatrix} = \begin{bmatrix} u_2(1) & u_3(1) & \cdots & u_M(1) \\ u_2(2) & u_3(2) & \cdots & u_M(2) \\ \vdots & \vdots & & \vdots \\ u_2(L) & u_3(L) & \cdots & u_M(L) \end{bmatrix} \cdot \begin{bmatrix} H_{21} \\ H_{31} \\ \vdots \\ H_{M1} \end{bmatrix} \quad (35)$$

In equation (35) l=1, ..., L denotes the FFT (fast fourier transformation) frame. L symbols are transmitted over each of the transmission lines $L_1$ to $L_M$. Equation (35) may be rewritten as:

$$\Delta y_1 = U_1 \cdot H_1 \quad (36)$$

This system of linear equations may be solved by using a least mean square algorithm:

$$H_1 = (U_1^{*T} \cdot U_1)^{-1} \cdot (U_1^{*T} \cdot \Delta y_1) = Q^{-1} \cdot b \quad (37)$$

$$Q = (U_1^{*T} \cdot U_1) \quad (38)$$

$$b = U_1^{*T} \cdot \Delta y_1 \quad (39)$$

In equation (37) $U_1^{*T}$ denotes the complex conjugated transpose of the matrix $U_1$. For calculating the matrix $H_1$ the square matrix Q is inverted and multiplied by the vector b.

The elements $q_{\nu\mu}$ of the matrix Q and $b_\nu$ of the vector b have the form:

$$q_{\nu\mu} = \sum_{k=1}^{L} U_{\nu+1}^*(k) \cdot U_{\mu+1}(k) \quad (40)$$

$$b_\nu = \sum_{k=1}^{L} U_{\nu+1}^*(k) \cdot \Delta y_1(k) \quad (41)$$

The elements $q_{\nu\mu}$ and $b_\nu$ may be calculated recursively, but may also be calculated as follows:

$$q_{\nu\mu}(1) = U_{\nu+1}^*(1) \cdot U_{\mu+1}(1) \quad (42)$$

$$q_{\nu\mu}(\lambda) = q_{\nu\mu}(\lambda-1) + U_{\nu+1}^*(\lambda) \cdot U_{\mu+1}(\lambda) \quad (43)$$

for $\lambda = 2, 3, \ldots, L$ and $\nu, \mu = 1, 2, \ldots, M-1$ $$b_\nu(1) = U_{\nu+1}^*(1) \cdot \Delta y_1(1) \quad (44)$$

$$b_\nu(\lambda) = b_\nu(\lambda-1) + U_{\nu+1}^*(\lambda) \cdot \Delta y_1(\lambda) \quad (45)$$

for $\lambda = 2, 3, \ldots, L$ and $\nu, \mu = 1, 2, \ldots, M-1$

Figure 11:
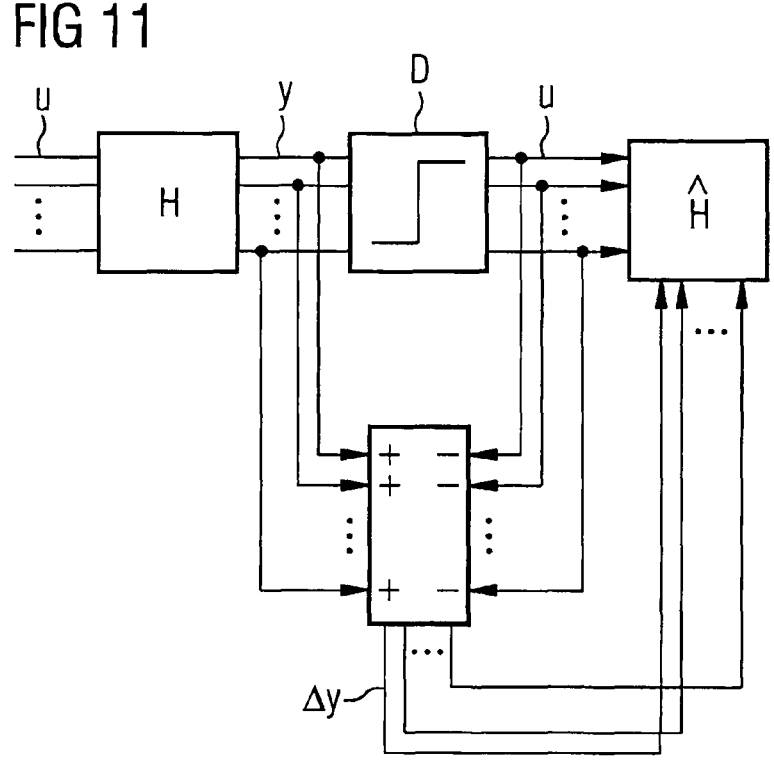
FIG. 11 illustrates an embodiment of a method IV.

During a first test interval, the M−1 elements of the first column of the transmission matrix $\hat{H}$ comprising the transfer functions $H_{ji}$ can be calculated as described above. The other columns of the matrix $\hat{H}$ are calculated accordingly. FIG. 11 schematically illustrates the determination of the matrix $\hat{H}$. Signals u are simultaneously transmitted over the transmission lines $L_1$ to $L_M$ where they are subject to crosstalk interference which is expressed by the matrix H. Signals y are received at the output terminals of the transmission lines $L_1$ to $L_M$ by the transceivers $RT_1$ to $RT_M$. The signals y are provided to a decider D. The decider D estimates which signal $u_i$ is closest to the signal $y_i$ and outputs the difference between the signals $y_i$ and $u_i$ as an error signal $\Delta y_i$. Alternatively, the signal $u_i$ may be known at the transceiver $RT_i$ and the error signal $\Delta y_i$ may then be the difference between the signal $y_i$ and the signal $u_i$ known at the transceiver $RT_i$. The vector $\Delta y$ containing the error signals $\Delta y_i$ as well as the vector u are used to calculate the elements of the matrix $\hat{H}$.

Figure 12:
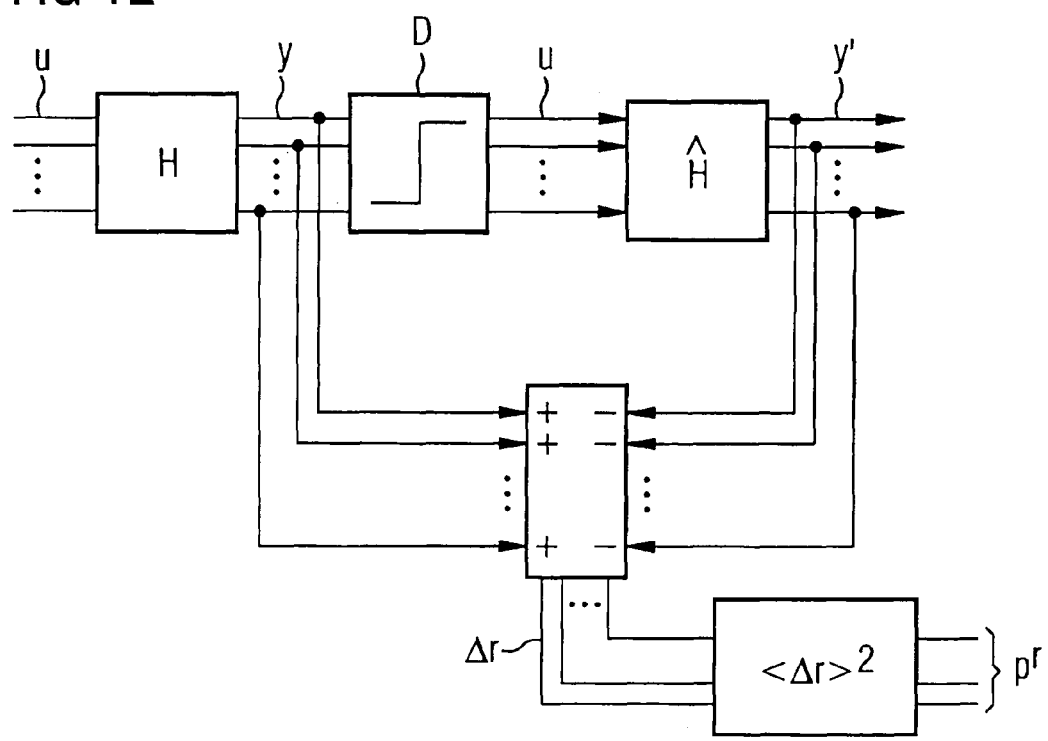
FIG. 12 illustrates a further embodiment of the method IV.

During a second test interval, the matrix $\hat{H}$ may be used to determine the noise power of the alien signals, which is schematically illustrated in FIG. 12. For this purpose, the signals u outputted by the decider D are weighted by the matrix $\hat{H}$ so that signals y' are obtained. The vector $\Delta r$, which is the difference between the signals y and y', is a measure of the alien noise. The mean square of the vector $\Delta r$ gives the alien noise power $pr_i$. The signal-to-noise power $Sn_i$ of the transmission line $L_i$ may be calculated as follows:

$$Sn_i = \frac{p_i}{\sum_{j=1, j \neq i}^{M} p_j \cdot |H_{ji}|^2 + pr_i} \quad (46)$$

Figure 13:
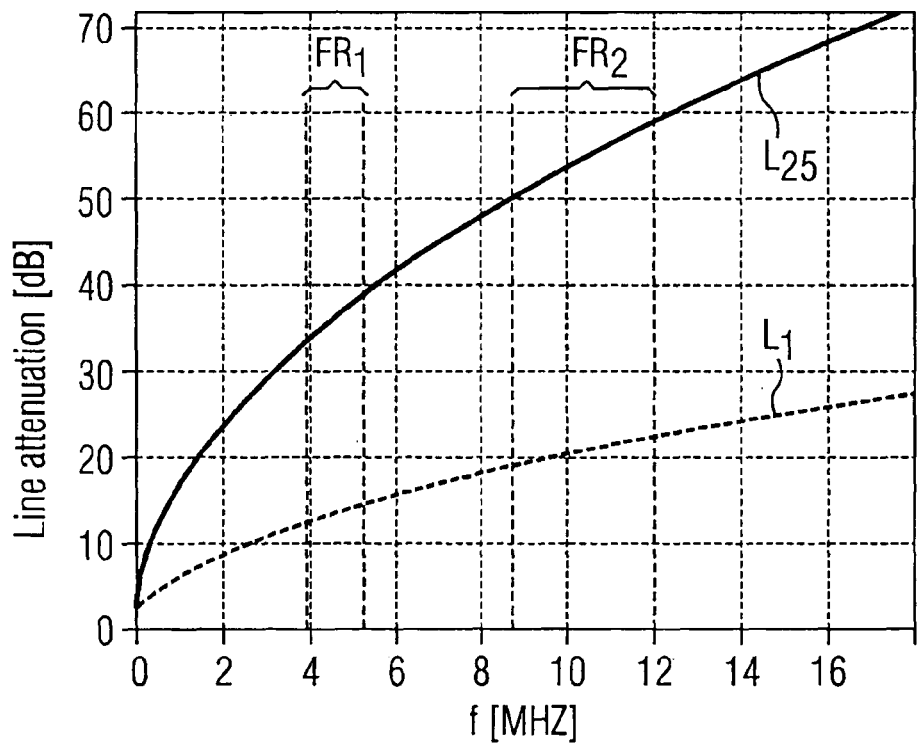
FIG. 13 illustrates line attenuations of the shortest and the longest transmission lines.

Description of Simulation Results:

In the following a simulation is presented which illustrates the methods described above. The simulated network is a VDSL network and comprises 25 transmission lines $L_1$ to $L_{25}$ of the type AWG 24. The lengths of the transmission lines $L_1$ to $L_{25}$ are evenly distributed between 300 m and 800 m. FIG. 13 shows the line attenuation over frequency for the shortest transmission line $L_1$ and the longest transmission line $L_{25}$ and also the allowed frequency ranges $FR_1$ and $FR_2$ for upstream transmission.

Figure 14:
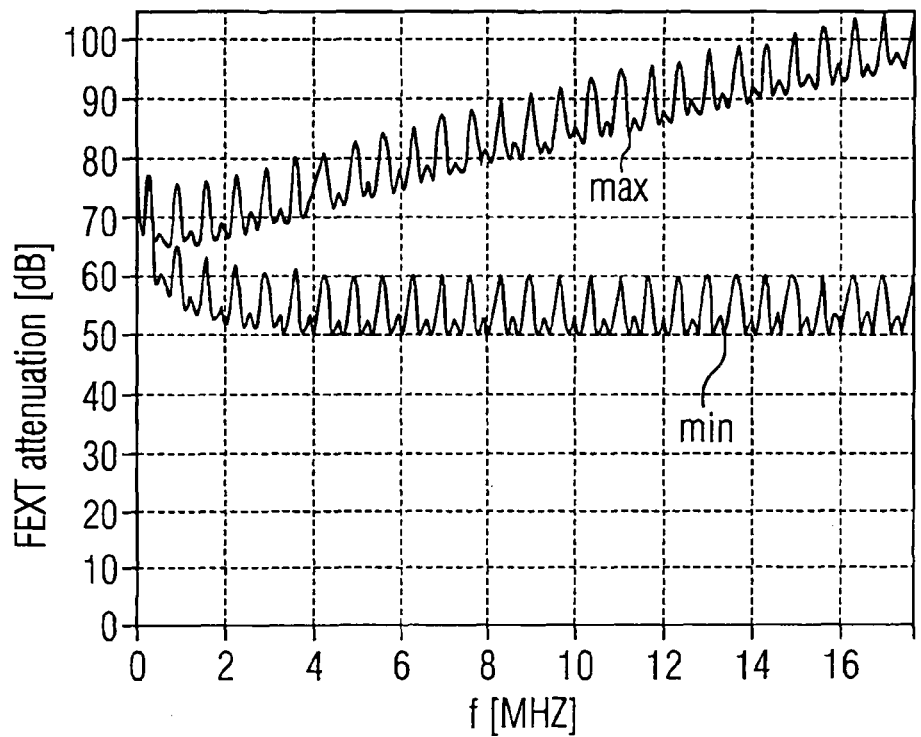
FIG. 14 illustrates minimum and maximum FEXT attenuations.

The simulation is carried out for data transmission in the upstream direction (from the transceivers $RT_1$ to $RT_M$ to the central office CO). The network is based on a model as shown in FIG. 3. FIG. 14 shows the minimum and maximum FEXT attenuation. Reflections at the terminations of the cables are considered as can be seen from the periodic parts of FIG. 14. All interference signals caused by alien noise have the same power level. The alien noise is superimposed by an additional white noise signal having a power spectral density of −140 dBm/Hz. The maximum transmit power $P_{max}$ of each of the transmission lines $L_1$ to $L_{25}$ is 13.5 dBm. The power spectral density is not limited.

Figure 15:
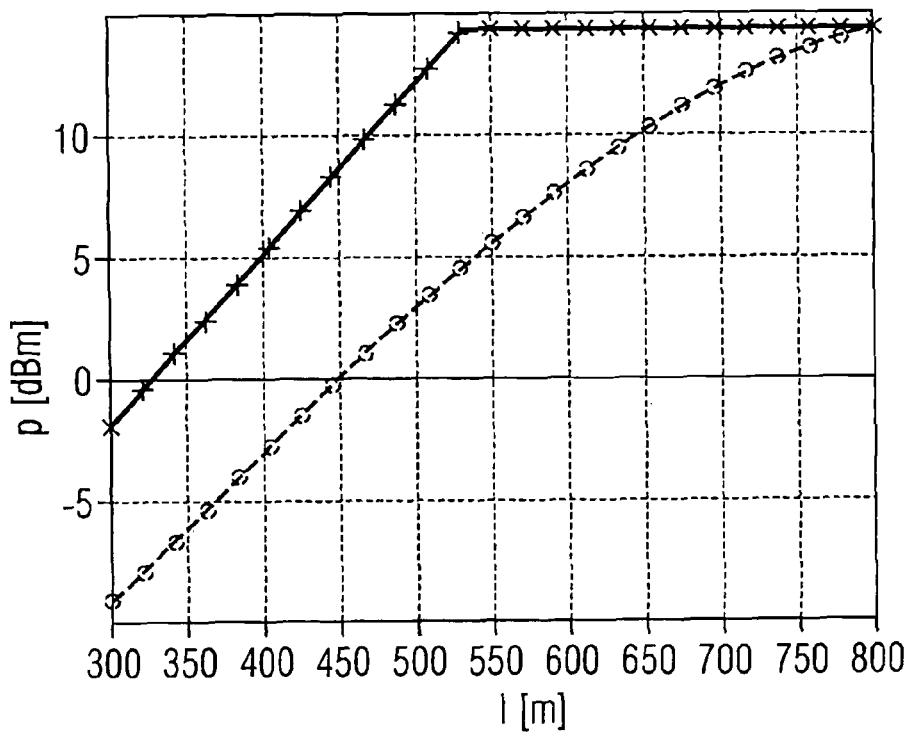
FIG. 15 illustrates exemplary results of a simulation of an embodiment of a method III.
Figure 16:
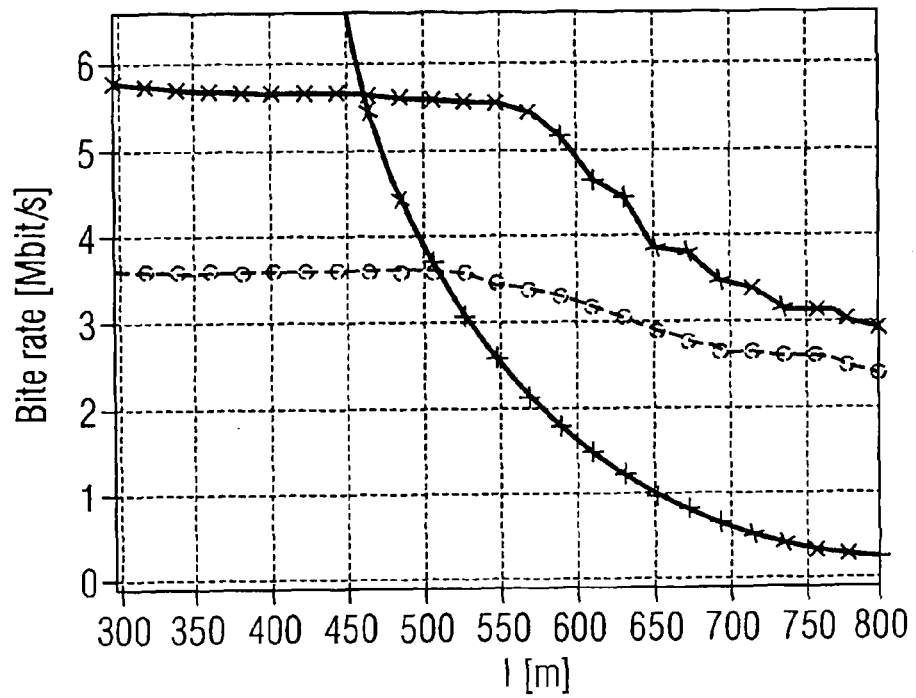
FIG. 16 illustrates further exemplary results of the simulation of the embodiment of the method III.

FIGS. 15 and 16 illustrate the results of the simulation. The transmit power for each of the transmission lines $L_1$ to $L_{25}$ are shown in FIG. 15. The bit rates of the transmission lines $L_1$ to $L_{25}$ are shown in FIG. 16. Data illustrated by asterisks were recorded using the method III, whereas data illustrated by circles were recorded using method II. Data illustrated by plus signs were recorded when signals were transmitted over all transmission lines $L_1$ to $L_{25}$ having the maximum transmit power. It can be seen from FIG. 15 that when performing the method III the transmission lines having a length above 530 m use the full maximum transmit power $P_{max}$ of 13.5 dBm, whereas the shorter transmission lines have smaller transmit powers.

While in the above exemplary embodiments have been described, it is to be understood that many modifications of these embodiments may be provided. For example, the transmission lines $L_1$ to $L_M$ may be replaced by wireless transmission links. Therefore, when reference is made to transmission lines, the transmission lines may be replaced by wireless transmission links.

The above exemplary systems may provide an xDSL system as well as a system of other services for transmitting data over the transmission lines $L_1$ to $L_M$. In addition, while the transmission system may use different frequency bands for downstream and upstream transmission, it may also use a same frequency band for both, downstream and upstream transmission. The above described embodiments are equally applicable to systems using timeslots for transmission.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A method, comprising:
selecting a first number of transmission channels from a plurality of transmission channels to correspond to a first transmission link by analyzing transmission characteristics of a first number of transmission links by a first selection circuit, wherein the selection depends on channel capacities of the first number of transmission channels;
transmitting a first signal over the selected first number of transmission channels;
selecting a second number of transmission channels from the plurality of transmission channels to correspond to a second transmission link by analyzing transmission characteristics of a second number of transmission links by a second selection circuit, wherein the selection depends on channel capacities of the second number of transmission channels and wherein the second number of transmission links comprises a subset of the first number of transmission links associated with the plurality of transmission channels; and
transmitting a second signal over the selected second number of transmission channels.

2. The method of claim 1, wherein:
the first number of transmission channels is selected such that a sum of the channel capacities of the first number of transmission channels is maximized, or
the second number of transmission channels is selected such that a sum of the channel capacities of the second number of transmission channels is maximized.

3. The method of claim 1, wherein the second number of transmission channels is greater than the first number of transmission channels.

4. The method of claim 1, wherein the second number of transmission links is chosen, based upon transmission link length, to comprise the subset of the first number of transmission links.

5. The method of claim 1, wherein the second number of transmission links comprises the first number of transmission links except one transmission link, the excluded link comprising the transmission link of the first number of transmission links having the lowest signal-to-noise ratio.

6. The method of claim 1, wherein the second number of transmission links comprises the first number of transmission links except one transmission link, the excluded link comprising the transmission link of the first number of transmission links having the longest length.

7. The method of claim 1, wherein the transmission links comprise hard-wired transmission lines.

8. The method of claim 1, wherein for each of the transmission links a maximum transmit power is pre-determined.

9. The method of claim 1, wherein the channel capacity of each of the transmission channels depends on signal-to-noise ratios of signals transmitted over the respective transmission channel.

10. The method of claim 1, wherein transmit power levels of signals transmitted over the transmission links are adjusted such that signals transmitted over the same transmission channel have the same signal-to-noise ratio after transmission.

11. The method of claim 1, wherein for each of the transmission channels a single signal-to-noise ratio is used to determine the channel capacity of the respective transmission channel.

12. A method, comprising:
selecting a first number of transmission channels from a plurality of transmission channels by a first selection circuit, wherein the selection depends on signal-to-noise ratios of signals transmitted over a first number of transmission links associated with the plurality of transmission channels;
transmitting a first signal over the selected first number of transmission channels;
selecting a second number of transmission channels from the plurality of transmission channels by a second selection circuit, wherein the selection depends on signal-to-noise ratios of signals transmitted over a second number of transmission links associated with the plurality of transmission channels and the second number of transmission links comprises a subset of the first number of transmission links; and
transmitting a second signal over the selected second number of transmission channels.

13. The method of claim 12, wherein:
for each of the transmission channels a single signal-to-noise ratio is used to select the first number of transmission channels, or
for each of the transmission channels a single signal-to-noise ratio is used to select the second number of transmission channels.

14. The method of claim 12, wherein transmit power levels of signals transmitted over the transmission links are adjusted such that signals transmitted over the same transmission channel have the same signal-to-noise ratio after transmission.

15. A device, comprising:
a first selection circuit configured to select a first number of transmission channels from a plurality of transmission channels for a first transmission link by analyzing transmission characteristics of a first number of transmission links, wherein the selection depends on channel capacities of the first number of transmission channels; and
a second selection circuit configured to select a second number of transmission channels from the plurality of transmission channels for a second transmission link by analyzing transmission characteristics of a second number of transmission links, wherein the selection depends on channel capacities of the second number of transmission channels and the second number of transmission links comprises a subset of the first number of transmission links.

16. The device of claim 15, wherein:
the first selection circuit selects the first number of transmission channels such that a sum of the channel capacities of the first number of transmission channels is maximized, or
the second selection circuit selects the second number of transmission channels such that a sum of the channel capacities of the second number of transmission channels is maximized.

17. The device of claim 15, wherein the second number of transmission links comprises the first number of transmission links except one transmission link, the excluded link comprising the transmission link of the first number of transmission links having the lowest signal-to-noise ratio.

18. The device of claim 15, wherein the second number of transmission links comprises the first number of transmission links except one transmission link, the excluded link comprising the transmission link of the first number of transmission links having the longest length.

19. The device of claim 15, wherein the channel capacity of each of the transmission channels depends on signal-to-noise ratios of signals transmitted over the respective transmission channel.

20. The device of claim 15, further comprising an adjustment circuit configured to adjust transmit power levels of signals transmitted over the transmission links such that signals transmitted over the same transmission channel have the same signal-to-noise ratio after transmission.

21. The device of claim 15, wherein for each of the transmission channels a single signal-to-noise ratio is used to determine the channel capacity of the respective transmission channel.

22. The device of claim 15, wherein the second number of transmission links is chosen, based upon transmission link length, to comprise the subset of the first number of transmission links.

23. A device, comprising:
a first selection circuit configured to select a first number of transmission channels from a plurality of transmission channels, wherein the selection depends on signal-to-noise ratios of signals transmitted over a first number of transmission links associated with the plurality of transmission channels; and
a second selection circuit configured to select a second number of transmission channels from the plurality of transmission channels, wherein the selection depends on signal-to-noise ratios of signals transmitted over a second number of transmission links associated with the plurality of transmission channels and the second number of transmission links comprises a subset of the first number of transmission links.

24. The device of claim 23, wherein:
for each of the transmission channels a single signal-to-noise ratio is used to select the first number of transmission channels, or
for each of the transmission channels a single signal-to-noise ratio is used to select the second number of transmission channels.

25. The device of claim 23, further comprising an adjustment circuit configured to adjust transmit power levels of signals transmitted over the transmission links such that signals transmitted over the same transmission channel have the same signal-to-noise ratio after transmission.

26. A method for increasing bit rate of longer transmission links, while reducing bit rate of shorter transmission links, comprising:
selectively choosing a number of transmission frequency channels, based upon channel capacities, for one or more transmission links, wherein the number of transmission frequency channels are chosen to allow for a transmission link transmit power that is proportional to a length of the one or more transmission links to increase transmission bit rates for longer transmission links while reducing transmission bit rates for shorter transmission links; and
transmitting a signal over the chosen number of transmission frequency channels.

* * * * *